(12) United States Patent
Wang et al.

(10) Patent No.: US 11,860,400 B2
(45) Date of Patent: Jan. 2, 2024

(54) BACKLIGHT COMPONENT, METHOD FOR MANUFACTURING BACKLIGHT COMPONENT, AND DISPLAY DEVICE

(71) Applicant: BOE Technology Group Co., Ltd., Beijing (CN)

(72) Inventors: Wei Wang, Beijing (CN); Jifeng Tan, Beijing (CN); Xiandong Meng, Beijing (CN); Wenqing Zhao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 608 days.

(21) Appl. No.: 16/474,574

(22) PCT Filed: Dec. 25, 2018

(86) PCT No.: PCT/CN2018/123573
§ 371 (c)(1),
(2) Date: Sep. 10, 2021

(87) PCT Pub. No.: WO2019/134562
PCT Pub. Date: Jul. 11, 2019

(65) Prior Publication Data
US 2022/0011497 A1    Jan. 13, 2022

(30) Foreign Application Priority Data
Jan. 3, 2018 (CN) .............................. 201810004725

(51) Int. Cl.
*F21V 8/00* (2006.01)
(52) U.S. Cl.
CPC ......... *G02B 6/0055* (2013.01); *G02B 6/0051* (2013.01); *G02B 6/0056* (2013.01)

(58) Field of Classification Search
CPC .. G02B 6/0055; G02B 6/0051; G02B 6/0056; G02B 6/0031; G02B 6/0053;
(Continued)

(56) References Cited

U.S. PATENT DOCUMENTS

| | | |
|---|---|---|
| 6,810,176 B2 | 10/2004 | Frick |
| 9,759,856 B2 | 9/2017 | Jung et al. |

(Continued)

FOREIGN PATENT DOCUMENTS

| | | |
|---|---|---|
| CN | 1549938 A | 11/2004 |
| CN | 101329463 A | 12/2008 |

(Continued)

OTHER PUBLICATIONS

English Machine Translation of Yamaguchi WO 2018/105545 (Year: 2023).*

(Continued)

*Primary Examiner* — Donald L Raleigh
(74) *Attorney, Agent, or Firm* — Lippes Mathias LLP

(57) ABSTRACT

The present disclosure relates to a backlight source, a method of manufacturing the backlight source, and a display device. The backlight source comprising: a light guide plate; a light emitting device on a side of the light guide plate in a thickness direction, wherein the light emitting device is configured to emit light irradiated into the light guide plate; and an optical element on a light emitting side of the light emitting device in a thickness direction, wherein the optical element is configured to convert the light emitted from the light emitting device into a parallel beam propagating in the light guide plate by total reflection. The light emitting device and the optical element may convert the light emitted from the light emitting device to be a parallel beam in the thickness direction of the light guide plate, so that the light may be coupled into the light guide plate according to needs (Continued)

when the light guide plate is rather thin, which facilitates to reduce the thickness of the backlight source and related products.

18 Claims, 3 Drawing Sheets

(58) Field of Classification Search
CPC . G02B 6/0018; G02B 6/005; G02F 1/133504; G02F 1/133617; G02F 1/292; G02F 1/19; G02F 1/133606; G02F 1/133615
See application file for complete search history.

(56) References Cited

U.S. PATENT DOCUMENTS

| | | | |
|---|---|---|---|
| 2014/0300528 A1* | 10/2014 | Ebisui | G02F 1/133606 345/32 |
| 2015/0185393 A1 | 7/2015 | Bang et al. | |
| 2015/0192725 A1 | 7/2015 | Facke et al. | |
| 2016/0195760 A1* | 7/2016 | Cho | G02F 1/133512 362/97.3 |
| 2017/0090089 A1 | 3/2017 | Kim et al. | |
| 2017/0168218 A1* | 6/2017 | Fu | G02B 6/0031 |
| 2017/0299794 A1* | 10/2017 | Fattal | G02B 30/33 |
| 2017/0363794 A1 | 12/2017 | Wan et al. | |
| 2019/0086599 A1 | 3/2019 | Meng et al. | |
| 2019/0094575 A1 | 3/2019 | Wang et al. | |
| 2019/0101797 A1 | 4/2019 | Wang et al. | |

FOREIGN PATENT DOCUMENTS

| | | | |
|---|---|---|---|
| CN | 104460115 A | 3/2015 | |
| CN | 106292052 A | 1/2017 | |
| CN | 106468801 A | 3/2017 | |
| CN | 206096694 U | 4/2017 | |
| CN | 106773218 A | 5/2017 | |
| CN | 107111059 A | 8/2017 | |
| CN | 107167925 A | 9/2017 | |
| CN | 107450211 A | 12/2017 | |
| CN | 107450234 A | 12/2017 | |
| CN | 107479128 A | 12/2017 | |
| WO | WO-2018105545 A1 * | 6/2018 | C08K 3/28 |

OTHER PUBLICATIONS

Extended European search report of counterpart EP application No. 18889972.8 dated Jul. 27, 2021.
International search report (including written opinion) of PCT application No. PCT/CN2018/123573 dated Mar. 27, 2019.
First office action of Chinese application No. 201810004725.6 dated Dec. 4, 2019.

* cited by examiner

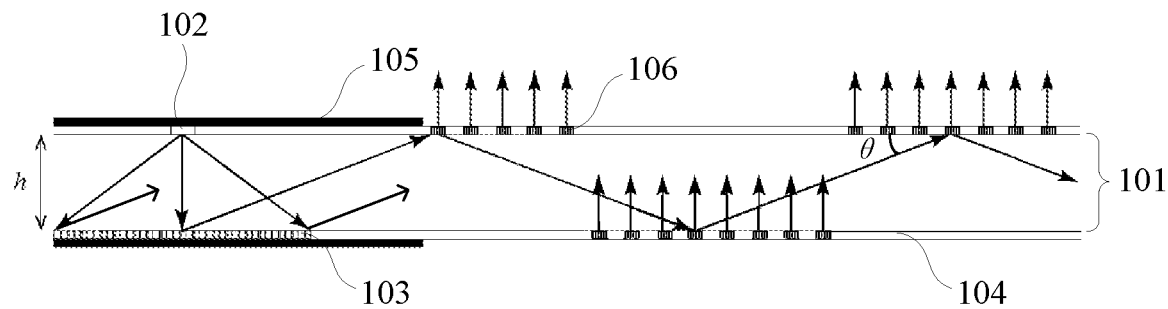
FIG. 1
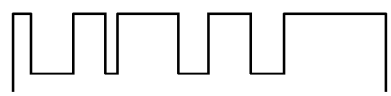
FIG. 2
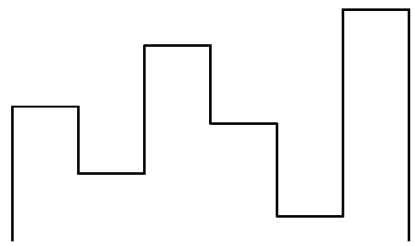
FIG. 3
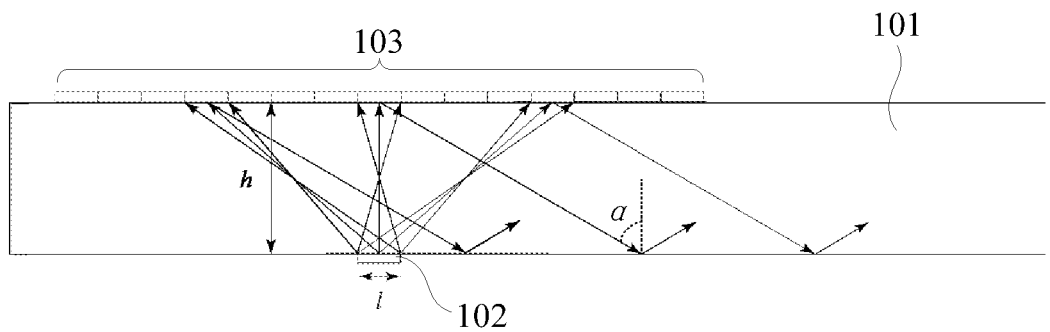
FIG. 4
the light emitting device is formed on a surface of a first side of the light guide plate in a thickness direction — S1
the optical element is formed on a surface of a second side of the light guide plate in the thickness direction — S2
FIG. 5

BACKLIGHT COMPONENT, METHOD FOR MANUFACTURING BACKLIGHT COMPONENT, AND DISPLAY DEVICE

CROSS-REFERENCE TO RELATED APPLICATION

This application is a 371 of International Application No. PCT/CN2018/123573 filed on Dec. 25, 2018 and entitled "Backlight Source, Method of Manufacturing Backlight Source, and Display Device", which claims priority to Chinese Patent Application No. 201810004725.6, filed on Jan. 3, 2018 and entitled "Backlight Source, Method of Manufacturing Backlight Source, and Display Device", the entire contents of which are incorporated herein by reference.

TECHNICAL FIELD

The present disclosure relates to a backlight component, a method for manufacturing backlight component, and a display device.

BACKGROUND

The liquid crystal display device includes a backlight component and a liquid crystal panel. Since the liquid crystal panel itself does not emit light, the backlight component is a light component to enable the liquid crystal panel to display images. Compared with a traditional direct-lit backlight component, an edge-lit backlight component has advantages of lightness and thinness and thereby is widely applied in liquid crystal display devices.

SUMMARY

The present disclosure provides a backlight component, a method for manufacturing backlight component, and a display device. The technical solutions are as follows:

According to a first aspect of the present disclosure, there is provided a backlight component. The backlight component comprises:
a light guide plate;
a light emitting device on a side of the light guide plate in a thickness direction, wherein the light emitting device is configured to emit light irradiated into the light guide plate; and
an optical element on a light emitting side of the light emitting device in a thickness direction, wherein the optical element is configured to convert the light emitted from the light emitting device into a parallel beam propagating in the light guide plate by total reflection.

In a possible implementation, wherein the optical element is one of:
the optical element includes a holographic microstructure;
the optical element has a polarization-dependent characteristic; and
the optical element is on a side of the light guide plate away from the light emitting device.

In a possible implementation, wherein the backlight component further comprises: at least one coupling grating on a surface of the light guide plate; wherein
each of the coupling gratings is configured to: convert the parallel beam to be an emitting beam at a light intensity ratio corresponding to the position where the coupling grating is located, the emitting beam being a collimated beam propagating in a direction away from the light guide plate.

In a possible implementation, wherein at least one coupling grating meets at least one of following conditions:
the at least one coupling gratings comprises: at least one projective coupling grating and at least one reflective coupling grating; the projective coupling grating is on the light emitting surface of the light guide plate, and the reflective coupling grating is on the surface away from the light emitting surface, and
the light intensity ratio corresponding to the at least one coupling grating is positively correlated with the distance between the coupling grating and the optical element.

In a possible implementation, wherein the backlight component further comprises: a filling layer which is on both sides of the light guide plate in the thickness direction, wherein the material of the light guide plate and the material of the filling layer meet at least one of the following conditions:
a material refractive index of the light guide plate is greater than a material refractive index of the filling layer, and
both the light guide plate and the filling layer include transparent material.

In a possible implementation, wherein the backlight component further comprises: a light absorbing layer on at least one side of the light guide plate, wherein a orthographic projection of the light emitting device on the light emitting surface of the light guide plate is in a orthographic projection of the light absorbing layer on the light emitting surface.

In a possible implementation, wherein the light emitting device is on edge area of a surface of a side of the light guide plate in the thickness direction.

In a possible implementation, backlight component further comprises: a filling layer, a light absorbing layer, at least one projective coupling grating and at least one reflective coupling grating;
the light guide plate is between the light emitting device and the optical element having a, and the optical element includes a holographic microstructure with a polarization-dependent characteristic;
the projective coupling grating is on the light emitting surface of the light guide plate, and the reflective coupling grating is on the surface away from the light emitting surface, and the light intensity ratio corresponding to the coupling gratings is positively correlated with the distance between the coupling grating and the optical element; each of the coupling gratings is configured to: convert the parallel beam that is incident to be an emitting beam at a light intensity ratio corresponding to the position where the coupling grating is located, the emitting beam being a collimated beam propagating in a direction away from the light guide plate;
the filling layer is on both sides of the light guide plate in the thickness direction, wherein the material refractive index of the light guide plate is greater than the material refractive index of the filling layer, and the light guide plate and the filling layer include transparent material;
the light absorbing layer is on at least one side of the light guide plate, the orthographic projection of the light emitting device on the light emitting surface of the light guide plate is in the orthographic projection of the light absorbing layer on the light emitting surface.

According to a second aspect of the present disclosure, there is provided a method for manufacturing a backlight component, comprising:

forming a light emitting device on a surface of a first side of a light guide plate in a thickness direction, wherein the light emitting device is configured to emit light irradiated into the light guide plate; and forming an optical element on a surface of a second side of the light guide plate in the thickness direction, wherein the optical element is configured to: convert the light emitted from the light emitting device into a parallel beam propagating in the light guide plate by total reflection.

According to a third aspect of the present disclosure, there is provided a display device, comprising any of the backlight component above.

In a possible implementation, wherein the display device further comprising: a light conversion layer, wherein the light conversion layer in each of sub-pixels of the display device comprises a light transmissive region and a light blocking region, wherein a beam provided by the backlight component for each of the sub-pixels is directed to the light blocking region of the sub-pixel.

In a possible implementation, wherein the display device further comprising: a liquid crystal layer, the backlight component and the light conversion layer;

wherein the liquid crystal layer is configured to: deflect, under a bright-state bias voltage, the collimated beam, provided by the backlight component for the sub-pixel, to be directed to the light transmissive region of each of the sub-pixels.

In a possible implementation, wherein the light emitting device is a blue light emitting device; the light conversion layer comprises a first light transmissive region, a transparent region and a second light transmissive region;

wherein the light conversion layer in the first light transmissive region comprises a first photoluminescent material for converting blue light into red light; and the light conversion layer in the second light transmissive region comprises a second photoluminescent material for converting blue light into green light.

In a possible implementation, wherein display device further comprises: a buffer layer, a transistor device layer, a planarization layer, a light conversion layer and a counter substrate;

wherein the buffer layer, the transistor device layer, the planarization layer, the light conversion layer and the counter substrate are sequentially on the backlight component in a direction away from the backlight component.

In a possible implementation, the backlight component further comprises: a filling layer, a light absorbing layer, at least one projective coupling grating and at least one reflective coupling grating;

the light guide plate is between the light emitting device and the optical element having a, and the optical element includes a holographic microstructure with a polarization-dependent characteristic;

the projective coupling grating is on the light emitting surface of the light guide plate, and the reflective coupling grating is on the surface away from the light emitting surface, and the light intensity ratio corresponding to the coupling gratings is positively correlated with the distance between the coupling grating and the optical element; each of the coupling gratings is configured to: convert the parallel beam that is incident to be an emitting beam at a light intensity ratio corresponding to the position where the coupling grating is located, the emitting beam being a collimated beam propagating in a direction away from the light guide plate;

the filling layer is on both sides of the light guide plate in the thickness direction, wherein the material refractive index of the light guide plate is greater than the material refractive index of the filling layer, and the light guide plate and the filling layer include transparent material;

the light absorbing layer is on at least one side of the light guide plate, the orthographic projection of the light emitting device on the light emitting surface of the light guide plate is in the orthographic projection of the light absorbing layer on the light emitting surface;

wherein the light emitting device is a blue light emitting device; the light conversion layer comprises a first light transmissive region, a transparent region and a second light transmissive region; wherein the light conversion layer in the first light transmissive region comprises a first photoluminescent material for converting blue light into red light; and the light conversion layer in the second light transmissive region comprises a second photoluminescent material for converting blue light into green light;

wherein display device further comprises: a buffer layer, a transistor device layer, a planarization layer, a light conversion layer and a counter substrate; wherein the buffer layer, the transistor device layer, the planarization layer, the light conversion layer and the counter substrate are sequentially stacked in a direction away from the backlight component.

In a possible implementation, the display device further comprising a grating layer and a light conversion layer that are sequentially stacked in a direction away from the backlight component, the light conversion layer in each of sub-pixels of the display device comprises a first region and a second region, and the beam provided by the backlight component for any of the sub-pixels is directed to the first region of the sub-pixel; and the grating layer comprises a deflection grating in each of the sub-pixels, and each of the deflection gratings is configured to deflect the collimated beam to be directed to the second region of the sub-pixel in which the collimated beam is located;

wherein the first region and the second region are respectively one of a light blocking region and a light transmissive region.

In a possible implementation, wherein the display device further comprises: a liquid crystal layer between the backlight component and the light conversion layer;

the deflection grating is in contact with the liquid crystal layer; the liquid crystal layer is configured to, under a dark-state bias voltage, have an edge refractive index that is same as a refractive index of a material for forming the grating layer; and the edge refractive index is a refractive index of the liquid crystal molecules, that are close to the grating layer in the liquid crystal layer for the collimated beam.

In a possible implementation, wherein the light emitting device is a blue light emitting device; the light conversion layer comprises a first light transmissive region, a transparent region and a second light transmissive region;

the light conversion layer in the first light transmissive region comprises a first photoluminescent material for converting blue light into red light; and the light conversion layer in the second light transmissive region comprises a second photoluminescent material for converting blue light into green light.

In a possible implementation, the display device further comprising a buffer layer, a transistor device layer, a liquid crystal layer, a planarization layer, and a counter substrate, wherein
the buffer layer, the transistor device layer, the grating layer, the liquid crystal layer, the planarization layer, the light conversion layer and the counter substrate are sequentially stacked in a direction away from the backlight component.

In a possible implementation, wherein, the backlight component further comprises: a filling layer, a light absorbing layer, at least one projective coupling grating and at least one reflective coupling grating;
the light guide plate is between the light emitting device and the optical element having a, and the optical element includes a holographic microstructure with a polarization-dependent characteristic;
the projective coupling grating is on the light emitting surface of the light guide plate, and the reflective coupling grating is on the surface away from the light emitting surface, and the light intensity ratio corresponding to the coupling gratings is positively correlated with the distance between the coupling grating and the optical element; each of the coupling gratings is configured to: convert the parallel beam that is incident to be an emitting beam at a light intensity ratio corresponding to the position where the coupling grating is located, the emitting beam being a collimated beam propagating in a direction away from the light guide plate;
the filling layer is on both sides of the light guide plate in the thickness direction, wherein the material refractive index of the light guide plate is greater than the material refractive index of the filling layer, and the light guide plate and the filling layer include transparent material;
the light absorbing layer is on at least one side of the light guide plate, the orthographic projection of the light emitting device on the light emitting surface of the light guide plate is in the orthographic projection of the light absorbing layer on the light emitting surface;
wherein the light emitting device is a blue light emitting device; the light conversion layer comprises a first light transmissive region, a transparent region and a second light transmissive region; wherein the light conversion layer in the first light transmissive region comprises a first photoluminescent material for converting blue light into red light; and the light conversion layer in the second light transmissive region comprises a second photoluminescent material for converting blue light into green light;
wherein display device further comprises: a buffer layer, a transistor device layer, a planarization layer, a light conversion layer and a counter substrate; wherein the buffer layer, the transistor device layer, the planarization layer, the light conversion layer and the counter substrate are sequentially stacked in a direction away from the backlight component.

BRIEF DESCRIPTION OF THE DRAWINGS

FIG. 1 is a schematic diagram of a structure of a backlight component according to an example of the present disclosure.

FIGS. 2 and 3 are respectively schematic diagrams of a structure of a modulation grating model according to an example of the present disclosure.

FIG. 4 is a schematic diagram of a principle of designing an optical element according to an example of the present disclosure.

FIG. 5 is a flow chart of steps of a method for manufacturing a backlight component according to an example of the present disclosure.

DETAILED DESCRIPTION

Figure 6:
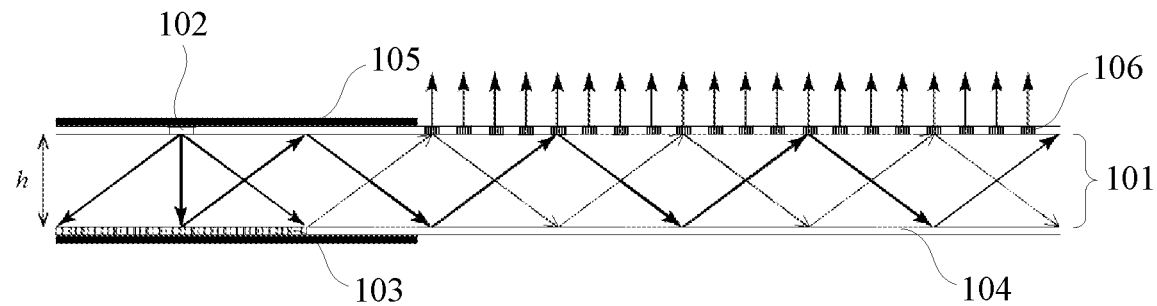
FIG. 6 is a schematic diagram of a structure of a backlight component according to another example of the present disclosure.

To make the principles and advantages of the present disclosure more clearly, the examples of the present disclosure will be described below in detail in conjunction with the accompanying drawings. It is obvious that the described examples are part rather than all of the examples of the present disclosure. All other examples obtained by those of ordinary skill in the art based on the examples of the present disclosure without creative work are within the protection scope of the present disclosure. Unless otherwise defined, technical terms or scientific terms used in the present disclosure shall be of ordinary meaning as understood by those of ordinary skill in the art to which the present disclosure pertains. The term "first" or "second" or a similar term used in the present disclosure does not denote any order, quantity, or importance, but is merely used to distinguish different components. The term "comprising" or a similar term means that elements or items which appear before the term include the elements or items listed after the term and their equivalents, and do not exclude other elements or items. The term "connection" or "connected to" or a similar term is not limited to a physical or mechanical connection but may include an electrical connection that is direct or indirect. For a typical edge-lit backlight component, there is a light emitting device on a side surface of a light guide plate, and the light is coupled in the light guide plate from the side surface and then uniformly emitted from a light emitting surface of the light guide plate via a lens or a prism. It may be noted that in such an edge-lit backlight component, an excessively thin light guide plate may make it difficult to attach the light emitting device to the side surface or may reduce the luminance of the light. Meanwhile, the necessary optical auxiliary structures and supporting structures may increase the thickness of the backlight component, which makes it difficult to reduce the thickness of the backlight component and thereby fails to meet the application requirements of the liquid crystal display devices that are thin and light.

FIG. 1 is a schematic diagram of a structure of a backlight component according to an example of the present disclosure, the backlight component is also known as a backlight source. Referring to FIG. 1, the backlight component includes a light guide plate 101, a light emitting device 102 and an optical element 103. Optionally, the backlight component may further include at least one of: a filling layer 104, a light absorbing layer 105 and a coupling grating 106 (FIG. 1 is an example that the backlight component further includes a filling layer 104, a light absorbing layer 105 and a coupling grating 106). It may be seen that the light guide plate 101 is horizontally placed in FIG. 1, and the upper side and the lower side of the light guide plate 101 in FIG. 1 are respectively two sides of the light guide plate in the thickness direction d. It shall be understood that the position shown in FIG. 1 is an edge area of the light guide plate 101, and the structure of remaining parts of the light guide plate 101 may be inferred from the structure shown in FIG. 1. It should be noted that a side of the light guide plate 101 may include a central area and an edge area around the central area, the light emitting device 102 may be at the edge area.

The light emitting device 102 is on an edge area of the upper side in the thickness direction of the light guide plate 101 (for example, on the surface of the side). The light emitting side of the light emitting device 102 faces downward, that is, towards the inside of the light guide plate 101. In an example, the light emitting device 102 is a light emitting diode (LED) chip that is embossed or attached to the light guide plate 101 on the edge area of the upper surface. In another example, the light emitting device 102 is a thin-film light emitting device manufactured and formed at the edge area of the upper surface of the light guide plate 101. Taking this as an example, the light emitting device 102 may emit light projected to the inside of the light guide plate 101.

It should be noted that the optical element herein refers to a structure capable of realizing certain optical functions in a backlight component, which may be, for example, a surface structure that implements optical functions through a surface topography as included, a holographic microstructure (a microstructure achieving optical functions based on holography), or a structure consisting of prisms or lenses. In FIG. 1, the optical element 103 is on the light emitting side of the light emitting device 102 (that is, the optical element 103 is on the side where the light emitting device 102 emits light), and the relative position between the optical element 103 and the light emitting device 102 is fixed. Optionally, the optical element 103 is on another side in the thickness direction of the light emitting device 102.

In an example, the light emitting device 102 is a point light source and emits light in a conical shape. At this time, the shape, position and size of the optical element 103 may be set according to the pattern that is presented when the light emitted from the light emitting device 102 is irradiated onto the lower surface of the light guide plate 101. For example, the optical element 103 is of a circular or elliptical shape centered on the axis of the cone (namely, the cone presented by the light emitted from the point light component), and can receive all of the light emitted from the light emitting device 102 to the lower surface of the light guide plate 101. As such, the distance between the light emitting device 102 and the optical element 103 is the thickness h of the light guide plate 101. In addition, the light emitting device 102 and the optical element 103 are opposite to each other along the propagation direction of the light, so as to fix the relative position between the optical element 103 and the light emitting device 102.

In yet another example, based on this, the optical element 103 may be provided within a range extended to the periphery, so that the range capable of receiving the light is larger than the range on which the light is practically irradiated. In this way, the deficiency in the manufacturing process at the edge area or in the reliability of the microstructure at the edge area may be prevented from affecting the light energy utilization rate of the optical element 103.

In yet another example, the light emitting device 102 is a linear light source and emits light in a pyramid shape. At this time, the shape, position and size of the optical element 103 may also be set according to the pattern that is presented when the light emitted from the light emitting device 102 is irradiated onto the lower surface of the light guide plate 101. For example, the optical element 103 is of a rectangle shape whose longitudinal direction coincides with the extending direction of the linear light component. Furthermore, the optical element 103 can receive all of the light emitted from the light emitting device 102 to the lower surface of the light guide plate 101. As such, the distance between the light emitting device 102 and the optical element 103 is the thickness h of the light guide plate 101. In addition, the light emitting device 102 and the optical element 103 are opposite to each other along the propagation direction of the light, so as to fix the relative position between the optical element 103 and the light emitting device 102.

The optical element 103 is configured to reflect the light emitted from the light emitting device 102 to be a parallel beam that propagates in the light guide plate 101 by total reflection. The angle between the propagation direction of the parallel beam and the light guide plate 101 is a preset propagation angle θ. wherein, the angle between the propagation direction and the light guide plate 101 is: the angle between the propagation direction and the light emitting surface of the light guide plate 101. In the disclosure, the light emitted by the light emitting device 102 may be converted, by the light emitting device 102 and holographic microstructure, into a parallel beam. Thus, the light may be coupled in the light guide plate even if the light guide plate is relatively thin, thereby reducing the thickness of the backlight module and related products, and enabling ultra-thin display products.

In an example, the optical element 103 is designed in advance regarding the wavefront of the light emitted from the light emitting device 102 by a surface pattern that is of a minute structure and formed by, for example, embossing or etching the lower surface of the light guide plate 101. For example, based on a wavelength of the light, a polarization state of the light, a refractive index of the medium on both sides, a incidence angle at different positions and a required reflection angle, parameters of the optical element 103 may be acquired by calculating by a simulation algorithm combined with a numerical optimization algorithm based on a modulation grating model.

In an example, the optical element 103 may convert the wavefront (approximate to a Lambertian distribution) that the LED chip emits light to be a waveguide mode (approximate to collimation) that the light propagates in the light guide plate 101 by a specific total reflection form. The phase modulation distribution of the optical element 103 may be represented by a power form of the x-y coordinate: $x0+y0+A10x+A01y+A20x2+A02y2+A11xy+A30x3+A03y3+A21x2y+A12xy2+\ldots$, wherein the x-y coordinate system is located in the plane of the optical element 103, the origin is located at the center of the optical element 103, and A10, A01, A11, . . . are all coefficients of respective powers. The simulation algorithm may be, for example, a scalar theory, an angular spectrum theory, a rigorous coupled wave analysis (RCWA) algorithm, a finite difference time domain (FDTD) algorithm, a finite element (FEM) algorithm or the like; the numerical optimization algorithm may be, for example, a genetic algorithm, a simulated annealing algorithm, a Bee colony algorithm or the like. Values of the coefficients of respective powers may be calculated by the aforesaid manner according to the necessary information, such as, the wavelength of the light, the polarization state of the light, the refractive index of the medium on both sides, the incidence angle at different positions and the required reflection angle. It may be understood that the optical element 103 may reflect the light emitted from the light emitting device 102 to be a parallel beam having a preset propagation angle θ inside the light guide plate 101. Thus, the optical element 103 is equivalent or approximately equivalent to a parabolic reflection surface having a focus at the light emitting device 102.

In an example, the aforesaid modulation grating model may have the form shown in FIG. 2 or FIG. 3 in each grating period. FIG. 2 shows a grating structure formed by sequentially arranging a plurality of protrusions that have the same height, wherein the width of the protrusions and the interval between adjacent protrusions are modulatable, and optical structures having different functions may be obtained according to different modulation manners. FIG. 3 shows a grating structure formed by closely arranging a plurality of steps that have the same width, wherein the height of each step is modulatable, and optical structures having different functions may be obtained under different modulation modes. Herein, modulatable parameters in each grating period may be calculated and modulated according to the aforesaid design manner based on, for example, the modulation grating model shown in FIG. 2 or FIG. 3, so as to obtain a grating structure that can convert the light emitted from the light emitting device 102 to be a parallel beam having a preset propagation angle θ, and thereby dispose the grating structure on the light guide plate 101 as the optical element 103.

In an example, the optical element 103 is polarization-dependent on the conversion of the light emitted from the light emitting device 102, so that the parallel beam converted by the optical element 103 may have a determined polarization state. For example, the optical element 103 may have a strong response to and a high diffraction efficiency for the light in a certain polarization state, so that the wavefront of the light emitted from the light emitting device 102 may be efficiently converted to be the waveguide mode that the light propagates in the light guide plate 101 by a specific total reflection manner. Meanwhile, the optical element 103 has a low diffraction efficiency for the light in other polarization states, and has substantially no effect as described above; and most of the light may be transmitted through the lower surface or the upper surface of the light guide plate 101.

In addition, in order to prevent stray light from affecting the light emitting, a light absorbing layer may be disposed on at least one side (either side or both the two sides) of the light guide plate 101 in the thickness direction. For example, a light absorbing layer 105 is disposed at an edge area, where the light emitting device 102 on the upper side and lower side is located respectively, of the light guide plate 101, so that the light that is not converted to be the parallel beam having the preset propagation angle θ may be absorbed by the light absorbing layer 105.

In an implementation manner, the light absorbing layer 105 may cover the light emitting device 102 and the optical element 103, and extend a predetermined distance along the propagation direction of the parallel beam, so as to ensure the light absorption effect. Meanwhile, the orthographic projection of the light emitting device 102 on the light emitting surface of the light guide plate 101 may be located in the orthographic projection of the light absorbing layer 105 on the light emitting surface. Of course, the manner of disposing the light absorbing layer 105 may not be limited to the manner described above.

Furthermore, in the design process as described above, the specific value between the conversion effects of the two types of the polarized lights may be used as the main optimization objective function during the stage of adopting the optimization algorithm, so as to achieve the aforesaid polarization-dependent effect.

FIG. 4 shows an example of the design of the optical element. Referring to FIG. 4, the modulation distribution of the refractive index in the optical element 103 may be designed in a form of diving the grating. That is, the optical element 103 is divided (equally or not equally, for example, equally in FIG. 4) into a plurality of regions in the radial direction (lateral direction or longitudinal direction, such as, the left-right direction in FIG. 4) to respectively perform the design. For example, if the regions into which the optical element 103 is divided are sufficient and dense enough, it can be approximately considered that the light irradiated onto the regions from the light emitting device 102 forms a parallel beam. Thus, the optical element 103 in the region may be designed, for example, in a design manner of a common reflection grating. For example, the grating period P is calculated according to the grating equation of the reflected wave, namely, n1 sin α−n1 sin α0=mλ/P (m=0, ±1, ±2, . . . ). In the grating equation, n1 is a material refractive index of the light guide plate 101, α is a complementary angle of the preset propagation angle θ (α+θ=90°, α0 is a incidence angle of the light (determined by the relative position between the regions and the light emitting device 102), m is a diffraction order, and λ is the wavelength of the light. Generally, the diffraction intensity of the zero-order and/or first-order diffraction of the grating is relatively large, which is much larger than the diffraction intensity of the high-order diffraction order. As shown in FIG. 4, in an example, the ratio of the thickness h of the light guide plate 101 to the diameter (such as, the length 1 shown in FIG. 4) of the circular light emitting device 102 may be set greater than 5, and the ratio of the diameter (or outer diameter) of the circular optical element 103 to the diameter (or outer diameter) of the circular light emitting device 102 may be set greater than 3, so as to ensure the light coupling efficiency achieved by the optical element 103. It may be understood that if the regions into which the optical element 103 is divided are increased in number and arrangement, the divergence angle of the light as received on each region of the optical element 103 from the light emitting device 102 may become smaller, and the light coupling efficiency as achieved by the design may become greater.

It should be noted that since the function of the optical element 103 is to convert the light emitted from the light emitting device 102 into a parallel beam that propagates in the light guide plate 101 by total reflection, the grating structure is required to have a high diffraction efficiency at a large diffraction angle (the diffraction angle shall enable the corresponding diffracted wave to meet the total-reflection conditions in the light guide plate). For example, the total reflection angle between the air interface and the medium having a refractive index of 1.5 is about 40 degrees. The grating period may be limited within a range of 1-2 um (micron), so as to ensure that there are enough distribution manners of the refractive index distributions to be selected in each grating period for effectively modulating the incident light wave, and the diffraction order to be optimized is not too high. Wherein the selection of the diffraction order may be calculated by the aforesaid grating equation.

FIG. 5 is a flow chart of steps of a method for manufacturing a backlight component according to an example of the present disclosure. Referring to FIG. 5, the method includes steps as follows.

In step S1, the light emitting device is formed on a surface of a first side of the light guide plate in a thickness direction.

The light emitting device is configured to emit light that is irradiated toward the inside of the light guide plate. In an example, referring to FIG. 1, a light emitting diode chip may be formed, by manner of embossing or attaching, at the edge area of the upper surface of the light guide plate 101 as the light emitting device 102. In another example, referring to FIG. 1, a thin-film light emitting device may be formed, by a semiconductor manufacturing process, at the edge area of the upper surface of the light guide plate 101 as the light emitting device 102. Of course, the manner in which the light emitting device is formed may not be limited to the aforesaid examples.

In step S2, the optical element is formed on a surface of a second side of the light guide plate in the thickness direction.

The optical element is disposed opposite to the light emitting device and configured to convert the light emitted from the light emitting device to be a parallel beam propagating in the light guide plate by total reflection.

In an example, the optical element 103 may be formed by an etching process performed on the surface of the light guide plate 101. For example, the manufacturing of the optical element 103 on the surface of the light guide plate 101 may be completed by: depositing a layer of photoresist on the lower surface of the light guide plate 101, exposing the photoresist with a mask plate having a pattern that corresponds to the grating structure (such as, a grating structure as shown in FIG. 2) as designed, removing the photoresist of the region to be etched by development, etching the surface of the light guide plate 101 in the region to be etched with an etchant corresponding to the material forming the light guide plate 101, and removing the remaining photoresist.

In another example, the optical element 103 may be formed by a micro-nano process performed on a dielectric layer, wherein the dielectric layer is disposed on the surface of the light guide plate 101. For example, the manufacturing of the optical element 103 may be completed by: depositing or attaching a layer of dielectric film on the lower surface of the light guide plate 101, and manufacturing the grating structure as designed on the surface of the dielectric film by a micro-nano process after aligning to the region in which the optical element 103 is disposed.

In yet another example, the optical element 103 is formed by a nanoimprint process, which includes steps of: preparing a template of the optical element 103, and imprinting, by the template, the surface of the light guide plate coated with the imprinting adhesive to thereby generate the desired optical element 103. In this process, a high-refractive imprinting adhesive may be used (or causing the refractive index difference between the imprinting adhesive and the material under the imprinting adhesive to be great by the selection of the material) to obtain a relatively high diffraction efficiency.

In an example, a parallel beam having a preset propagation angle θ propagates in the light guide plate 101 by total reflection. In order to meet the total-reflection conditions, a filling layer 104 may be respective disposed on both sides of the light guide plate 101 in the thickness direction as shown in FIG. 1. The material refractive index of the light guide plate 101 shall be greater than that of the filling layer 104, and the relationship between the preset propagation angle θ, the material refractive index of the light guide plate 101, and the material refractive index of the filling layer 104 shall also meet the total-reflection conditions. It should be noted that the light absorbing layer 105 in FIG. 1 is disposed on a side of the filling layer 104 away from the light guide plate 101, so as to meet the total-reflection conditions in the region covered by the light absorbing layer 105. Moreover, the light emitting device 102 in FIG. 1 is attached to the upper surface of the light guide plate 101. That is, the light emitting device 102 is disposed on a side of the filling layer 104 close to the light guide plate 101, which is more advantageous for controlling the precision of the distance between the light emitting device 102 and the optical element 103. Moreover, the optical element 103 in FIG. 1 is disposed on a side of the filling layer 104 close to the light guide plate 101, which is more advantageous for controlling the precision of the distance between the light emitting device 102 and the optical element 103. The optical element 103 is disposed on a side of the light absorbing layer 105 close to the light guide plate, so that the light is not blocked by the light absorbing layer 105.

In FIG. 1, a coupling grating 106 is provided on both sides of the light guide plate 101 in the thickness direction, and configured to convert, according to a light intensity ratio corresponding to the position where the coupling grating 106 is located, the incident parallel beam to be an emitting beam. The emitting beam is a collimated beam propagating in a direction away from the light guide plate 101, and an angle between the propagation direction of the emitting beam and the light guide plate 101 is the preset exiting angle. The light intensity ratio in the case of reflection may be the reflectivity, and the light intensity ratio in the case of transmission may be the transmissivity.

In an example, as shown in FIG. 1, the parallel beam propagates, by manner of total reflection, between the upper surface and lower surface of the light guide plate 101 by a preset propagation angle θ, and the coupling grating 106 may reflect or transmit the incident parallel beam to be the emitting beam perpendicular to the light guide plate 101 (for example, as shown by a plurality of upward pointing arrows in FIG. 1, the preset emitting angle is 90°). In addition, the light intensity of all the emitting beam is evenly distributed on the light emitting surface of the backlight component. For example, the emitting beam arriving at the upper surface of the light guide plate 101 may be configured to have the same light intensity. It can be understood that the light intensity of the parallel beam propagating in the light guide plate 101 by total reflection in this case is gradually reduced, and thus light intensities of different coupling gratings 106 that the parallel beam arriving are different. In order to make the emitting beams have the same light intensity, the coupling grating 106 shall not only have a function of converting the parallel beam to be the required emitting beam, but also have a light intensity ratio having a corresponding value according to the position.

In an example, the at least one coupling grating 106 includes a plurality of coupling gratings 106 (the number of coupling gratings 106 is more than one), and the light intensity ratio corresponding to the coupling grating 106 is positively correlated with the distance between the coupling grating 106 and the optical element 103. For example, the light intensity ratio corresponding to the coupling grating 106 gradually increases along the propagation path of the parallel beam inside the light guide plate 101. In an example, in order to distribute the energy of one parallel beam evenly to one hundred emitting beams, the light intensity ratio of the one hundred coupling gratings 106 that are arranged in sequence along the propagation path of the parallel beam shall be sequentially 1/100, 1/99, 1/98, . . . , 1.

It can be understood that each coupling grating 106 may convert the incident parallel beams to be emitting beams and parallel beams that continue to propagate, wherein all the incidence angle, incident light intensity, reflection angle, reflective light intensity, refraction angle, and refractive light intensity have expected values. Accordingly, each kind of the grating structure of the coupling grating 106 having the expected optical characteristics may be obtained in advance according to, for example, any one of the manners in which the optical element 103 is designed. Then, the coupling grating 106 is manufactured on a surface of the light guide plate 101 in accordance with any one of the manners that the optical element 103 is manufactured. It may be understood that the coupling grating 106 may have a grating structure as shown in FIG. 2 or FIG. 3, or may have a grating structure same with the grating structure of a regular grating that has only one valley and one ridge in each grating period, it may be not limited to this. When the parallel beam has a preset polarization state, the light intensity ratio corresponding to each coupling grating 106 may be also set by referencing the principle of the polarizer. Due to different application requirements, the coupling grating 106 may also be designed in such a way that the emitting beam is a collimated beam (a beam that propagates in parallel with a divergence angle less than a certain threshold).

It may also be understood that since the coupling grating 106 is disposed at a position where the light needs to be emitted from the backlight component, the coupling grating 106 may be provided in a light emitting region of the backlight component. It should be understood that if the backlight component includes a light absorbing layer 105, the light absorbing layer 105 shall be provided outside the light emitting region of the backlight component. Furthermore, the coupling grating 106 works only when a parallel beam is incident. Thus, the coupling grating 106 shall be disposed in an irradiation region that refers to a region on the surface of the light guide plate 101 through which the parallel beam passes as propagating in the light guide plate 101 by total reflection, such as, a surface region of the light guide plate 101 distributed with the coupling grating 106 as shown in FIG. 1. By designing the beam width of the parallel beam and the preset propagation angle θ, the projection of the irradiation region on the plane of the light guide plate 101 may spread all over the entire light emitting region of the backlight component, which thereby ensures that the light intensity of the emitting beam is evenly distributed on the light emitting surface of the backlight component.

In an example, the material for forming the light guide plate 101 may be, for example, transparent material such as glass or resin, and the refractive index may be within the range of 1.5-2.0; especially a material having a refractive index of 1.7-1.8 or 1.8. The material for forming the filling layer 104 may be, for example, a resin material having a refractive index of 1.2-1.4, especially a material having a refractive index of 1.2 or 1.2-1.3. In the case where the light guide plate 101 and the filling layer 104 are both formed of transparent material, the backlight component may have good transparency, so as to be applied to transparent display devices.

FIG. 6 is a schematic diagram of a structure of a backlight component according to another example of the present disclosure. Comparing FIG. 6 and FIG. 1, it can be seen that all of the coupling gratings 106 in the backlight component shown in FIG. 6 are disposed on the upper side of the light guide plate 101, and the value of the preset propagation angle θ is slightly increased. At this time, in order to meet the total-reflection conditions, the requirement that the material refractive index of the light guide plate 101 shall be sufficiently large and the requirement that the material refractive index of the filling layer 104 shall be sufficiently small both come to be relatively strict. However, it can be seen that the coupling gratings 106 are all configured to be transmissive gratings and are all disposed on the upper surface of the light guide plate. Thus, for the backlight component shown in FIG. 6, the difficulties in design and manufacturing process of the coupling gratings 106 may be somewhat reduced.

It may be seen that in the backlight component shown in FIG. 1 and the backlight component shown in FIG. 6, the light emitting device 102 and the optical element 103 are both disposed in such a manner as that: the light guide plate 101 has a first side and a second side in the thickness direction; the light emitting device 102 is disposed on a surface of the first side of the light guide plate 101; the optical element 103 is disposed on a surface of the second side of the light guide plate 102; and the light emitting device 102 and the optical element 103 are disposed opposite to each other. In this way, a desired distance between the light emitting device 102 and the optical element 103 may be provided by the thickness of the light guide plate 101, which facilitates to reduce the overall thickness of the backlight component. In a variant example, the light emitting device 102 may also be disposed inside the light guide plate 101, such as, at a bottom of a groove provided on the upper surface of the light guide plate 101. In this way, the desired distance may be precisely controlled when the desired distance between the light emitting device 102 and the optical element 103 is less than the thickness of the light guide plate 101.

Figure 7:
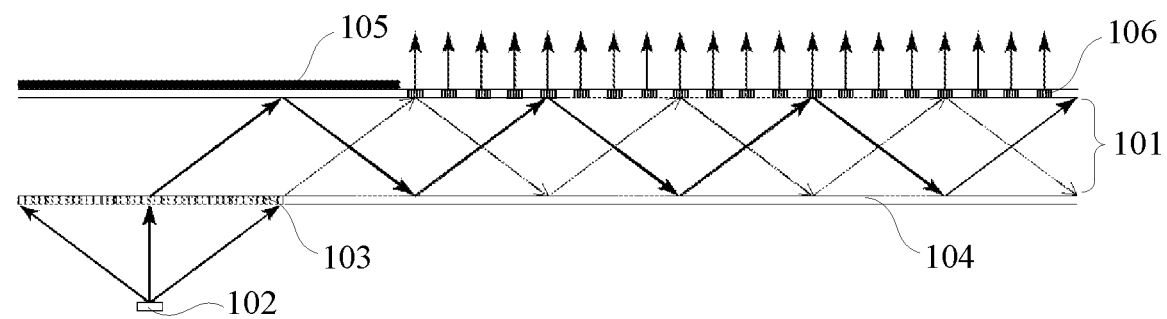
FIG. 7 is a schematic diagram of a structure of a backlight component according to another example of the present disclosure.

FIG. 7 is a schematic diagram of a structure of a backlight component according to yet another example of the present disclosure. Comparing FIG. 6 and FIG. 1, it can be seen that the light absorbing layer provided on the lower surface of the light guide plate 101 is removed on the basis of the backlight component shown in FIG. 6, and the light emitting device 102 and the optical element 103 are both disposed on the lower side of the light guide plate 101. In this way, the light emitting device 102 may be fixed on the surface of the side of the filling layer 104 away from the light guide plate 101 by a mechanical structure such as a bracket or a casing, so that the relative positional relationship between the light emitting device 102 and the optical element 103 can be set after the manufacturing of the surface structure of the light guide plate 101 is completed, which facilitates the subsequent adjustments and repairs, and thereby solves the problem that the product yield cannot be guaranteed due to the limitation in precision of the process.

Figure 8:
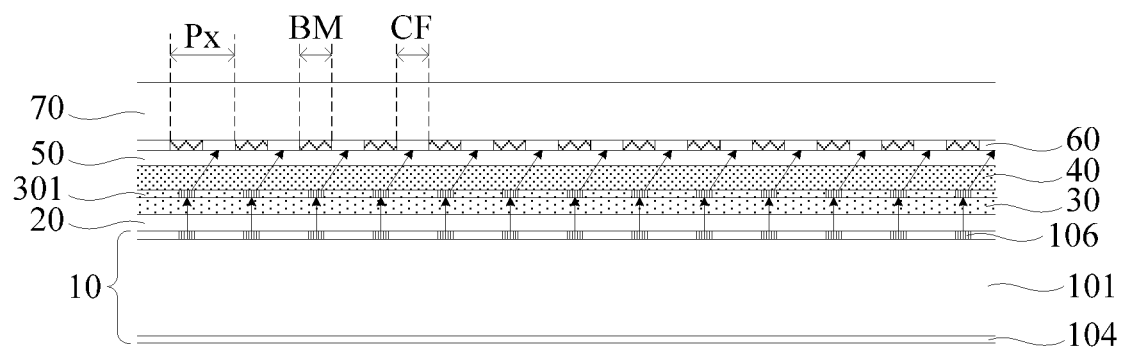
FIG. 8 is a schematic diagram of a structure of a display device according to an example of the present disclosure.

FIG. 8 is a schematic diagram of a structure of a display device according to an example of the present disclosure. Referring to FIG. 8, the display device includes a backlight component 10, and a buffer layer 20, a transistor device layer 30, a grating layer 301, a liquid crystal layer 40, a planarization layer 50, a light conversion layer 60, and a counter substrate 70 which are sequentially stacked in a direction away from the backlight component 10. The transistor device layer 30 includes the grating layer 301.

The backlight component 10 may have a structure of any one of the backlight component 10 described above. As shown in FIG. 8, the display device includes a plurality of sub-pixels Px (the specific number is determined according to demands). The backlight component 10 is capable of providing a collimated beam for different sub-pixels Px via different coupling gratings 106, that is, the backlight component 10 provides a separate collimated beam for each of the sub-pixels Px.

In an example, the coupling grating 106 is provided on the upper surface of the light guide plate 101 in a manner (size, shape, positional relationship, etc.) corresponding to the manner in which the sub-pixels Px of the display device are arranged, so that the backlight component 10 provides a separate collimated beam for each sub-pixel Px of the display device via different coupling gratings 106, respectively. At this time, each coupling grating 106 of the backlight component 10 is aligned with a sub-pixel Px of the display device in the thickness direction, so that each collimated beam that is emitted from the coupling grating 106 and not yet incident to the buffer layer 20 is directed to the corresponding sub-pixel Px. For example, the sub-pixels Px in the display region of FIG. 8 are arranged in a manner exactly same with the coupling gratings 106 in the light emitting region, and each emitting beam of the backlight component 10 is vertically incident to the corresponding sub-pixel Px.

It may be understood that for a surface-type backlight component that uniformly emits light over the entire surface, each sub-pixel Px may be provided with a separate collimated beam based on the relationship between the backlight component 10 and the sub-pixel Px. In addition, since there is no light emitted from the backlight component 10 between the collimated beams, the light emitted from the backlight component may be utilized by the sub-pixel Px in an increased proportion, which facilitates to improve the utilization of the light energy provided by the light emitting device, and further facilitates to increase the display brightness of the display device and reduce the power consumption.

As shown in FIG. 8, the light conversion layer 60 in the display device includes a light transmissive region CF and a light blocking region BM, and all the collimated beam provided by the backlight component 10 for any of the sub-pixels Px is directed to the light blocking region BM of the light conversion layer 60 in the sub-pixel Px.

In an example, when the liquid crystal layer 40 that corresponds to the sub-pixel Px is located in an electric field formed by a bright-state bias voltage, the collimated beam may be deflected toward the light transmissive region CF of the light conversion layer 60 as shown in FIG. 8, so that the collimated light may be emitted passing through the light transmissive region CF, thereby enabling the sub-pixel Px to present a bright state. When the liquid crystal layer 40 that corresponds to the sub-pixel Px is located in an electric field formed by a dark-state bias voltage, the collimated beam may not be deflected. At this time, the collimated beam may be emitted to and absorbed by the light blocking region BM of the light conversion layer 60, which enables the sub-pixel Px to present a dark state. If the collimated beam is directly emitted to the light blocking region BM when the liquid crystal layer 40 is not applied with an additional electric field, the entire surface of the display device may present a dark state if there is no power supply, which facilitates to improve the contrast degree. In an example, the collimated beam may also be diverged by the optical structure between the light component 10 and the light conversion layer 60 (a beam having a relatively small divergence angle is converted to a beam having a relatively large divergence angle), so that the collimated beam that is diverged passes through the light transmissive region CF around the light blocking region BM to enable the sub-pixel Px to present a bright state, which may also be applied to enable the sub-pixel Px to switch between the bright state and the dark state.

In an example, the light emitting device in the backlight component 10 is a light emitting device of monochromatic light. Based on this, the display device may achieve monochrome display or multicolor display. In an example, the light conversion layer 60 is a low-haze scattering film layer in the light transmissive region CF, whereby the color of the sub-pixel Px in a bright state is the color of the light emitting device. In addition, the light emitting direction is not limited to the direction opposite to the propagation direction of the beam. It may be seen that the display device may achieve the monochrome display. In another example, the light conversion layer 60 in the light transmissive region CF includes a photoluminescent material. For example, the light emitting device in the backlight component 10 is a blue light emitting device, and the light conversion layer 60 includes a first light transmissive region CF, a transparent region CF and a second light transmissive region CF. The light conversion layer 60 in the first light transmissive region CF includes a first photoluminescent material for converting the blue light into red light, and the light conversion layer 60 in the second light transmissive region CF includes a second photoluminescent material for converting the blue light into green light. In this way, the sub-pixel Px in the bright state may be red, blue or green according to the type of the material in the light transmissive region, so that the display device may achieve the color display in an appropriate arrangement manner. For example, the light transmissive regions CF shown in FIG. 8 may be arranged regularly from left to right in an order of: a first light transmissive region, a transparent region, a second light transmissive region, a first light transmissive region, a transparent region, and a second light transmissive region.

Furthermore, the design manner of the coupling grating 106 may be adjusted with respect to the difference in the conversion efficiency of each color, so that the emitting light intensities of different colors may achieve a balance (that is, the coupling grating 106 is configured to provide emitting beams having different light intensities since the type of the corresponding sub-pixel is different). For example, based on the aforesaid example, the light intensity of the collimated beam provided for the blue sub-pixel may be appropriately reduced, and the light intensity of the collimated beam provided for the red sub-pixel and the green sub-pixel may be appropriately increased.

As shown in FIG. 8, the surface of the grating layer 301 is in contact with the liquid crystal layer 40. In each of the sub-pixels Px, the collimated beam is directed to the light blocking region BM of the light conversion layer. The grating layer 301 includes a deflection grating disposed in each of the sub-pixels Px, and the deflection grating is configured to deflect the transmitted collimated beam toward the light transmissive region CF of the light conversion layer 60. In yet another example, in each of the sub-pixels Px, the collimated beam is directed to the light transmissive region CF of the light conversion layer. The grating layer 301 includes a deflection grating disposed in each of the sub-pixels Px, and the deflection grating is configured to deflect the transmitted collimated beam toward the light blocking region BM of the light conversion layer 60.

It should be understood that an expected refraction angle of the transmitted beam of the deflection grating in each sub-pixel Px may be determined according to the positional relationship between the center of the light transmissive region CF and the center of the deflection grating in the each sub-pixel Px. In the case that the wavelength, polarization state, and beam width of the collimated beam are known, each kind of the deflection grating structure having expected optical characteristics may be obtained in advance according to, for example, any one of above mentioned design for the optical element. Then, the deflection grating is manufactured on the upper surface of the transistor device layer 30 in accordance with any one of the manners that the optical element 103 is manufactured, so as to form a structure having the desired grating layer 301. It may be understood that the deflection grating may have a grating structure as shown in FIG. 2 or FIG. 3, or may have a grating structure of a common grating that only has one valley and one ridge in each grating period, or may be not limited to this.

Based on this, the liquid crystal layer 40 may be configured to have, under the dark-state bias voltage, an edge refractive index same as the material refractive index of the grating layer 301. The edge refractive index refers to a refractive index for the collimated beam refracted by liquid crystal molecules that are close to the grating layer 301 in the liquid crystal layer 40. In an example, when the liquid crystal layer 40 is located in the electric field formed by the dark-state bias voltage, by selecting a liquid crystal mode in which the liquid crystal molecules are rotated in a deflection plane of the light or by using a blue phase liquid crystal, the liquid crystal molecules that are close to the grating layer 301 may be polarized in the deflection plane of the light, and the refractive index in the thickness direction of the display device for the light in the wavelength band of the collimated beam is equal to the refractive index of the material for forming the grating layer 301. When such liquid crystal molecules are filled between the protrusions of the deflection grating, the refractive indexes at both sides of the interface of the deflection grating are the same. Thus, the light may not deflect as passing through the interface of the deflection grating, which means that the deflection grating loses the function of changing the propagation direction of the collimated beam. In this way, the collimated beam may continue to propagate along the original propagation direction and is absorbed as arriving at the directed light blocking region BM, thereby causing the sub-pixel Px to present a dark state. It may be understood that when the liquid crystal layer 40 is located in the electric field formed by the bright-state bias voltage (for example, no power is supplied), the liquid crystal molecules may be in a disorderly uniform state and cause no influence on the deflection grating, so that the collimated beam may be deflected toward the light transmissive region CF after passing through the deflection grating, thereby causing the sub-pixel Px to present a bright state. As for the bright-state bias voltage and the dark-state bias voltage, the liquid crystal molecules in the liquid crystal layer 40 may also be in a state between the two cases. Thus, other gray scales between the bright state and the dark state may be displayed depending on different bias voltages. Therefore, the display gray scale of each sub-pixel Px may be controlled by changing the applied bias voltage.

It should be understood that although the backlight component described above is adopted in the display device that implements the aforesaid liquid crystal display mode, the backlight component in the display device that implements the liquid crystal display mode may not be limited to the manners described above. Within a possible range, any backlight component that can provide each sub-pixel Px a collimated beam directing to the first region may be used to implement the display device in the aforesaid liquid crystal display mode. At this time, the extent to which the collimated beam is deflected to the second region may be controlled via different bias voltages, thereby further controlling the display gray scale of each sub-pixel Px. The first region and the second region are respectively one of the light blocking region BM and the light transmissive region CF of the light conversion layer 60.

In an example, the display device is manufactured from a first substrate and a second substrate by a liquid crystal cell forming process. The first substrate is obtained by sequentially manufacturing the buffer layer 20 and the transistor device layer 30 on the light emitting side of the backlight component 10. The second substrate is obtained by sequentially manufacturing the light conversion layer 60 and the planarization layer 50 on the backlight side of the counter substrate 70. The buffer layer 20 may be formed of a material, such as a transparent insulating resin, silicon oxide, silicon nitride or the like, may have a refractive index of, for example, 1.2-1.4, and may mainly function to provide a flat surface to prepare for the formation of the transistor device layer 30. The transistor device layer 30 may include structures, such as, a gate conductive layer, a gate insulating layer, an active layer, a source/drain conductive layer, a passivation layer, a transparent conductive layer (such as, including a pattern of a pixel electrode formed of an indium tin oxide material), and a planarization layer, and may be implemented within a possible range by referring to an array substrate in any of the display devices of the prior art. The aforesaid grating layer 301 may be formed, for example, on the surface of the planarization layer of the transistor device layer 30, or may be disposed, for example, on the interface between two adjacent layers of the transistor device layer 30. The material for forming the counter substrate 70 may be, for example, transparent material, such as glass or a transparent resin, and the refractive index may be, for example, 1.5-2.0. The light conversion layer 60 may include, for example, a structure of a black matrix layer and a color light conversion layer, and may be implemented within a possible range by referring to a color filter substrate in any of the display devices of the prior art. The planarization layer 50 may be formed of a material, such as a transparent insulating resin, silicon oxide, silicon nitride or the like, and have a refractive index of, for example, 1.2-1.4.

Figure 9:
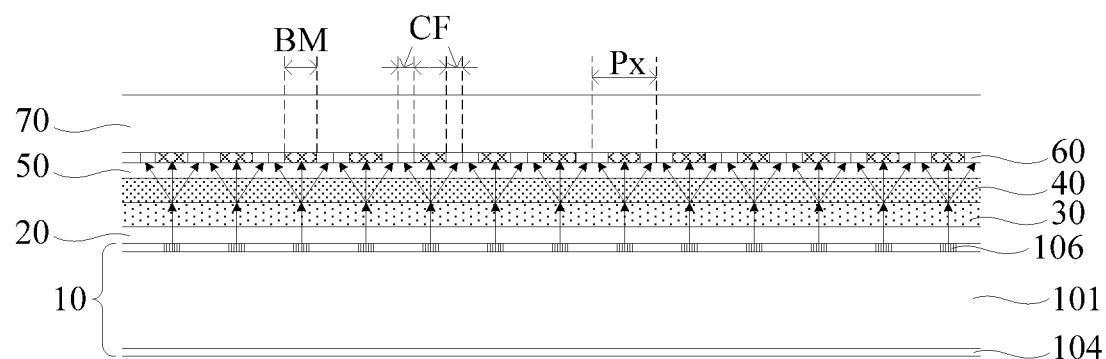
FIG. 9 is a schematic diagram of a structure of a display device according to another example of the present disclosure.

FIG. 9 is a schematic diagram of a structure of a display device according to another example of the present disclosure. Compared with FIG. 8, it can be seen that settings of the grating layer 301 and the deflection grating are removed from the display device shown in FIG. 9. The central position of the sub-pixel Px is set to correspond to the position of the coupling grating 106, and the liquid crystal lens formed in the liquid crystal layer 40 is adopted to control the display gray scale of each sub-pixel Px. The light blocking region BM in the sub-pixel Px is disposed in the center of the sub-pixel Px, and the light transmissive region CF is disposed around the light blocking region BM. When the liquid crystal layer 40 is located in the electric field formed by the bright-state bias voltage, the liquid crystal lens (such as, an equivalent lenticular lens formed by deflection of the liquid crystal molecules) is formed in the liquid crystal layer 40 to diverge the collimated beam from the coupling grating 106, so that the collimated beam is transmitted as divergent light, and a part of the divergent light is transmitted through the light transmissive region CF, thereby achieving the bright display of the sub-pixel Px. When the liquid crystal layer 40 is not powered or is located in an electric field formed by a dark-state bias voltage, the liquid crystal layer 40 may not have the function to diverge the collimated beam, so that the collimated beam continues to propagate along the original propagation direction and is absorbed by the directed light blocking region BM, thereby causing the sub-pixel Px to present a dark state.

In an example, the light emitting device in the backlight component 10 is a light emitting device of monochromatic light. Based on this, the display device may achieve monochrome display or multicolor display.

In an example, the light conversion layer 60 is a low-haze scattering film layer in the light transmissive region CF, whereby the color of the sub-pixel Px in a bright state is the color of the light emitting device. In addition, the light emitting direction is not limited to the direction opposite to the propagation direction of the beam. It may be seen that the display device may achieve the monochrome display.

In another example, the light conversion layer 60 in the light transmissive region CF includes a photoluminescent material. For example, the light emitting device in the backlight component 10 is a blue light emitting device, and the light conversion layer 60 includes a first light transmissive region CF, a transparent region CF, and a second light transmissive region CF. The light conversion layer 60 in the first light transmissive region CF includes a first photoluminescent material for converting the blue light into red light, and the light conversion layer 60 in the green light transmissive region CF includes a second photoluminescent material for converting the blue light into green light. In this way, the sub-pixel Px in the bright state may be red, blue or green according to the type of the material in the light transmissive region, so that the display device may achieve the color display in an appropriate arrangement manner. For example, the light transmissive regions CF of respective sub-pixels Px shown in FIG. 9 may be arranged regularly from left to right in an order of: a first light transmissive region, a transparent region, a second light transmissive region, a first light transmissive region, a transparent region and a second light transmissive region. Furthermore, the design manner of the coupling grating 106 may be adjusted with respect to the difference in the conversion efficiency of each color, so that the emitting light intensities of different colors may achieve a balance (that is, the coupling grating 106 is configured to provide emitting beams having different light intensities since the type of the corresponding sub-pixel is different). For example, the light intensity of the collimated beam provided for the blue sub-pixel may be appropriately reduced based on examples described above, and the light intensity of the collimated beam provided for the red sub-pixel and the green sub-pixel may be appropriately increased.

In an example, every n sub-pixels Px in any of the display devices described above constitute a pixel unit (n is a positive integer). For example, in a display device that achieves monochrome display, each sub-pixel Px corresponds to a pixel point in the display screen. Thus, each pixel unit in the display device is composed of one sub-pixel Px. In another example, in the aforesaid display device for achieving the color display of three colors that are red, blue, and green, one pixel point in the display screen corresponds to three sub-pixels that are arranged in series but have different colors. Thus, each pixel unit in the display device is composed of a red sub-pixel, a blue sub-pixel and a green sub-pixel that are arranged in series.

It should be noted that the display device of the present disclosure may be any product or component having a display function, such as a mobile phone, a tablet computer, a TV set, a display, a notebook computer, a digital photo frame, a navigator etc. As an example, FIG. 10 is a schematic diagram of a three-dimensional structure of a display device according to an example of the present disclosure.

Figure 10:
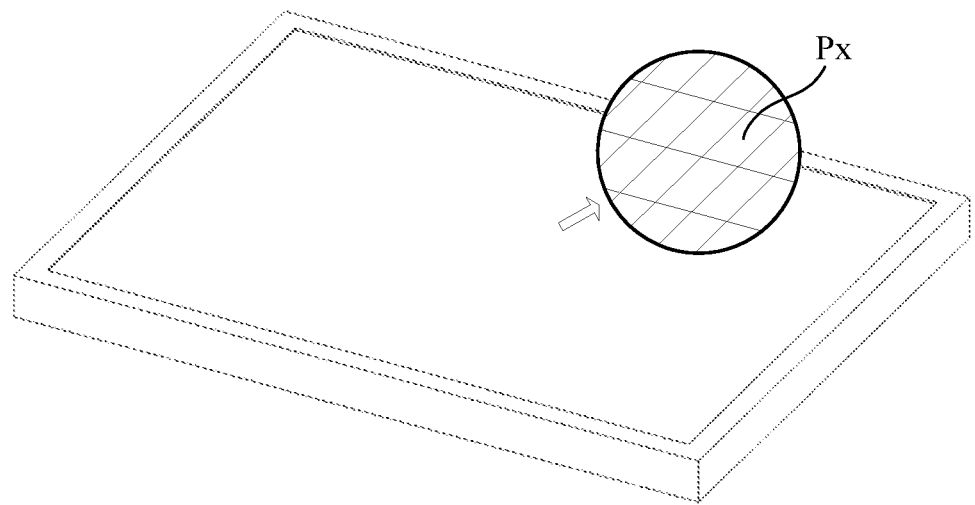
FIG. 10 is a schematic diagram of a three-dimensional structure of a display device according to an example of the present disclosure.

Referring to FIG. 10, the display device includes sub-pixels Px arranged in rows and columns in a display region. The display device may include any one of the backlight components described above, or may have an internal structure of any of the display devices described above. Since the included backlight component is much lighter and thinner, the display device may have a smaller thickness. Due to the included internal structure, settings of the microstructure (for example, the deflection grating and the coupling grating) may be omitted from the pixel opening of the display device, so as to avoid the problem that the transparent region may conflict with the display region of the transparent display device, thereby facilitating to achieve a high transmittance of the transparent display device. Due to the included internal structure, settings of the polarizer or the metal polarization grid may also be omitted from the display device, thereby greatly improving the display transmittance. Due to the integrated design of the backlight component and the array substrate, the coupling grating and the sub-pixels may be precisely aligned, thereby preventing the alignment error that occurs as forming the cell from affecting the internal optical path.

In the present application, "at least one" refers to one or more, and "a plurality" refers to two or more. "At least one of the following" or its analogous expression refers to any combination of these items, including any combination of single or plural items. For example, at least one of a, b or c may represent: a, b, c, a+b, a+c, b+c, and a+b+c, where a, b, c may be a single item or multiple items.

It should be noted that in the drawings, the dimensions of layers and regions may be exaggerated for clarity of illustration. It is also understood that when an element or layer is referred to as "on" another element or layer, it may be directly on the other element or the intermediate layer may be present. In addition, it can be understood that when an element or layer is referred to as "under" another element or layer, it may be directly under the other element, or there may be more than one intermediate layer or component. In addition, it can also be understood that when a layer or element is referred to as being "between" two or two elements, it can be a single layer or a single layer between two elements, or more than one intermediate layer or component. Similar reference numerals indicate similar components throughout in the disclosure.

In the present disclosure, the terms "first", "second", etc. are used for descriptive purposes only, and are not to be construed as indicating or implying relative importance.

It should be noted that the example of the method provided by the example of the present invention can refer to the corresponding structural example, and the example of the present invention does not limit this. The sequence of the steps of the method examples of the present invention can be appropriately adjusted, and the steps can be correspondingly increased or decreased according to the situation. Any person skilled in the art can easily think of the changes within the technical scope disclosed by the present invention. The method should be covered by the scope of the present invention, so it will not be described again.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

The foregoing descriptions are only exemplary examples of the present disclosure, and are not intended to limit the present disclosure. Within the spirit and principles of the disclosure, any modifications, equivalent substitutions, improvements, etc., are within the protection scope of the present disclosure.

The invention claimed is:

1. A backlight component, comprising:
a light guide plate;
a light emitting device on a side of the light guide plate in a thickness direction, wherein the light emitting device is configured to emit light irradiated into the light guide plate; and
an optical element on a light emitting side of the light emitting device in a thickness direction, wherein the optical element is configured to convert the light emitted from the light emitting device into a parallel beam propagating in the light guide plate by total reflection, wherein the backlight component further comprises: a filling layer on both sides of the light guide plate in the thickness direction,
wherein a material of the light guide plate and a material of the filling layer meet at least one of the following conditions:
a material refractive index of the light guide plate is greater than a material refractive index of the filling layer, and both the light guide plate and the filling layer include transparent material.

2. The backlight component according to claim 1, wherein the backlight component further comprises: at least one coupling grating on a surface of the light guide plate;
wherein each of the coupling gratings is configured to convert the parallel beam to be an emitting beam at a light intensity ratio corresponding to the position where the coupling grating is located, the emitting beam being a collimated beam propagating in a direction away from the light guide plate.

3. The backlight component according to claim 2, wherein the at least one coupling grating meets at least one of following conditions:
the at least one coupling grating comprises: at least one projective coupling grating and at least one reflective coupling grating; the projective coupling grating is on the light emitting surface of the light guide plate, and the reflective coupling grating is on the surface away from the light emitting surface; and
the light intensity ratio corresponding to the at least one coupling grating is positively correlated with the distance between the coupling grating and the optical element.

4. The backlight component according to claim 1, wherein the backlight component further comprises: a light absorbing layer on at least one side of the light guide plate, wherein a orthographic projection of the light emitting device on the light emitting surface of the light guide plate is in a orthographic projection of the light absorbing layer on the light emitting surface.

5. A method for manufacturing a backlight component according to claim 1, comprising:
forming a light emitting device on a surface of a first side of a light guide plate in a thickness direction, wherein the light emitting device is configured to emit light irradiated into the light guide plate; and
forming an optical element on a surface of a second side of the light guide plate in the thickness direction, wherein the optical element is configured to convert the light emitted from the light emitting device into a parallel beam propagating in the light guide plate by total reflection.

6. The backlight component according to claim 1, wherein the optical element is one of:
the optical element includes a holographic microstructure;
the optical element has a polarization-dependent characteristic; and
the optical element is on a side of the light guide plate away from the light emitting device.

7. The backlight component according to claim 1, wherein the light emitting device is on edge area of a surface of a side of the light guide plate in the thickness direction.

8. The backlight component according to claim 1, backlight component further comprises: a light absorbing layer, at least one projective coupling grating and at least one reflective coupling grating;
the light guide plate is between the light emitting device and the optical element, and the optical element includes a holographic microstructure with a polarization-dependent characteristic;
the projective coupling grating is on the light emitting surface of the light guide plate, and the reflective coupling grating is on the surface away from the light emitting surface, and the light intensity ratio corresponding to the coupling gratings is positively correlated with the distance between the coupling grating and the optical element; each of the coupling gratings is configured to: convert the parallel beam that is incident to be an emitting beam at a light intensity ratio corresponding to the position where the coupling grating is located, the emitting beam being a collimated beam propagating in a direction away from the light guide plate;
the light absorbing layer is on at least one side of the light guide plate, the orthographic projection of the light emitting device on the light emitting surface of the light guide plate is in the orthographic projection of the light absorbing layer on the light emitting surface.

9. A display device, comprising: a backlight component, wherein the backlight component comprising:
a light guide plate;
a light emitting device on a surface of a side of the light guide plate in a thickness direction, wherein the light emitting device is configured to emit light irradiated into the light guide plate; and
an optical element on another side of the light emitting device, wherein the optical element is configured to: convert the light emitted from the light emitting device into a parallel beam propagating in the light guide plate by total reflection,
wherein, the display device further comprising a grating layer and a light conversion layer that are sequentially stacked in a direction away from the backlight component,
the light conversion layer in each of the sub-pixels of the display device comprises a first region and a second region, and the beam provided by the backlight component for any of the sub-pixels is directed to the first region of the sub-pixel; and the grating layer comprises a deflection grating in each of the sub-pixels, and each of the deflection gratings is configured to deflect the collimated beam to be directed to the second region of the sub-pixel that the collimated beam is located;

wherein the first region and the second region are respectively one of a light blocking region and a light transmissive region.

10. The display device according to claim 9, wherein the display device further comprising: a light conversion layer the light conversion layer in each of sub-pixels of the display device comprises a light transmissive region and a light blocking region, wherein a beam provided by the backlight component for each of the sub-pixels is directed to the light blocking region of the sub-pixel.

11. The display device according to claim 10, wherein the display device further comprising: a liquid crystal layer that is between the backlight component and the light conversion layer;

wherein the liquid crystal layer is configured to: deflect, under a bright-state bias voltage, the collimated beam, provided by the backlight component for the sub-pixel, to be directed to the light transmissive region of each of the sub-pixels.

12. The display device according to claim 10, wherein the light emitting device is a blue light emitting device; the light conversion layer comprises a first light transmissive region, a transparent region and a second light transmissive region;

wherein the light conversion layer in the first light transmissive region comprises a first photoluminescent material for converting blue light into red light; and the light conversion layer in the second light transmissive region comprises a second photoluminescent material for converting blue light into green light.

13. The display device according to claim 9, wherein the display device further comprises: a liquid crystal layer between the grating layer and the light conversion;

the deflection grating is in contact with the liquid crystal layer; the liquid crystal layer is configured to, under a dark-state bias voltage, have an edge refractive index that is same as a refractive index of a material for forming the grating layer; and the edge refractive index is a refractive index of the liquid crystal molecules, that are close to the grating layer in the liquid crystal layer for the collimated beam.

14. The display device according to claim 9, wherein the light emitting device is a blue light emitting device; the light conversion layer comprises a first light transmissive region, a transparent region and a second light transmissive region;

the light conversion layer in the first light transmissive region comprises a first photoluminescent material for converting blue light into red light; and the light conversion layer in the second light transmissive region comprises a second photoluminescent material for converting blue light into green light.

15. The display device according to claim 9, the display device further comprising a buffer layer, a transistor device layer, a liquid crystal layer, a planarization layer, and a counter substrate, wherein the buffer layer, the transistor device layer, the grating layer, the liquid crystal layer, the planarization layer, the light conversion layer and the counter substrate are sequentially stacked in a direction away from the backlight component.

16. The display device according to claim 10, wherein display device further comprises: a buffer layer, a transistor device layer, a planarization layer, a light conversion layer and a counter substrate;

wherein the buffer layer, the transistor device layer, the planarization layer, the light conversion layer and the counter substrate are sequentially stacked in a direction away from the backlight component.

17. The display device according to claim 11, the backlight component further comprises: a filling layer, a light absorbing layer, at least one projective coupling grating and at least one reflective coupling grating;

the light guide plate is between the light emitting device and the optical element, and the optical element includes a holographic microstructure with a polarization-dependent characteristic;

the projective coupling grating is on the light emitting surface of the light guide plate, and the reflective coupling grating is on the surface away from the light emitting surface, and the light intensity ratio corresponding to the coupling gratings is positively correlated with the distance between the coupling grating and the optical element; each of the coupling gratings is configured to: convert the parallel beam that is incident to be an emitting beam at a light intensity ratio corresponding to the position where the coupling grating is located, the emitting beam being a collimated beam propagating in a direction away from the light guide plate;

the filling layer is on both sides of the light guide plate in the thickness direction, wherein the material refractive index of the light guide plate is greater than the material refractive index of the filling layer, and the light guide plate and the filling layer include transparent material;

the light absorbing layer is on at least one side of the light guide plate, the orthographic projection of the light emitting device on the light emitting surface of the light guide plate is in the orthographic projection of the light absorbing layer on the light emitting surface;

wherein the light emitting device is a blue light emitting device; the light conversion layer comprises a first light transmissive region, a transparent region and a second light transmissive region; wherein the light conversion layer in the first light transmissive region comprises a first photoluminescent material for converting blue light into red light; and the light conversion layer in the second light transmissive region comprises a second photoluminescent material for converting blue light into green light;

wherein display device further comprises: a buffer layer, a transistor device layer, a planarization layer, a light conversion layer and a counter substrate; wherein the buffer layer, the transistor device layer, the planarization layer, the light conversion layer and the counter substrate are sequentially stacked in a direction away from the backlight component.

18. The display device according to claim 13, wherein, the backlight component further comprises: a filling layer, a light absorbing layer, at least one projective coupling grating and at least one reflective coupling grating;

the light guide plate is between the light emitting device and the optical element, and the optical element includes a holographic microstructure with a polarization-dependent characteristic;

the projective coupling grating is on the light emitting surface of the light guide plate, and the reflective coupling grating is on the surface away from the light emitting surface, and the light intensity ratio corresponding to the coupling gratings is positively correlated with the distance between the coupling grating and the optical element; each of the coupling gratings is configured to: convert the parallel beam that is incident to be an emitting beam at a light intensity ratio corresponding to the position where the coupling grating is located, the emitting beam being a collimated beam propagating in a direction away from the light guide plate;

the filling layer is on both sides of the light guide plate in the thickness direction, wherein the material refractive index of the light guide plate is greater than the material refractive index of the filling layer, and the light guide plate and the filling layer include transparent material;

the light absorbing layer is on at least one side of the light guide plate, the orthographic projection of the light emitting device on the light emitting surface of the light guide plate is in the orthographic projection of the light absorbing layer on the light emitting surface;

wherein the light emitting device is a blue light emitting device; the light conversion layer comprises a first light transmissive region, a transparent region and a second light transmissive region; wherein the light conversion layer in the first light transmissive region comprises a first photoluminescent material for converting blue light into red light; and the light conversion layer in the second light transmissive region comprises a second photoluminescent material for converting blue light into green light;

wherein display device further comprises: a buffer layer, a transistor device layer, a planarization layer, a light conversion layer and a counter substrate; wherein the buffer layer, the transistor device layer, the planarization layer, the light conversion layer and the counter substrate are sequentially stacked in a direction away from the back.

* * * * *